United States Patent

Fenton

[15] 3,679,688

[45] July 25, 1972

[54] PREPARATION OF SUBSTITUTED PYRIDINES

[72] Inventor: Donald M. Fenton, Anaheim, Calif.

[73] Assignee: Union Oil Company of California, Los Angeles, Calif.

[22] Filed: April 23, 1970

[21] Appl. No.: 31,371

Related U.S. Application Data

[63] Continuation-in-part of Ser. No. 637,891, May 12, 1967, abandoned.

[52] U.S. Cl.........................................................260/290 P
[51] Int. Cl. ..........................................................C07d 31/06
[58] Field of Search....................................................260/290

[56] References Cited

UNITED STATES PATENTS 3,463,781  8/1969  Bell et al................................260/290

Primary Examiner—Henry R. Jiles
Assistant Examiner—Harry I. Moatz
Attorney—Milton W. Lee, Richard C. Hartman, Lannas S. Henderson and Robert E. Strauss

[57] ABSTRACT

Substituted pyridines are prepared by reacting an ethylenically unsaturated hydrocarbon, carbon monoxide, hydrogen and ammonia in a liquid medium containing a Group VIII noble metal catalyst in complex association with a biphyllic ligand at a temperature of 50° to 400° C. and a pressure of 5 to 300 atmospheres. A typical process comprises contacting ethylene, carbon monoxide and hydrogen with a liquid reaction medium containing ammonium hydroxide, rhodium trichloride and triphenylphosphine to produce 3,5-dimethyl, 2-ethyl pyridine.

13 Claims, No Drawings

3,679,688

PREPARATION OF SUBSTITUTED PYRIDINES

This application is a continuation-in-part of application, Ser. No. 637,891, now abandoned.

DESCRIPTION OF THE INVENTION

This invention relates to the preparation of hydrocarbon substituted, particularly alkyl substituted, pyridines. More particularly, the invention relates to preparation of such pyridines by reaction of an ethylenically unsaturated hydrocarbon with carbon monoxide, hydrogen and ammonia in the presence of a complex noble metal catalyst.

The products of the reaction are useful raw materials for the production of various pharmaceuticals such as sulfonamides, antihistamines, etc., and for other useful chemical products such as surfactants and solvents for synthetic resins. They are also useful as solvents and catalysts for certain organic reactions. The products of the process have the general formula:

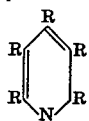

wherein R is hydrogen or a hydrocarbyl group with its identity depending, of course, on the olefinic reactant and being alkyl, cycloalkyl, alkylcycloalkyl, cycloalkylalkyl, aryl, alkaryl, or aralkyl. The product contains at least one hydrocarbyl substituent.

Prior art patents such as U. S. Pat. Nos. 2,935,513; 2,963,484; and 2,995,558 disclose preparation of pyridine or substituted pyridines by reaction of aldehydes, alcohols, acetylenic compounds, etc., with ammonia. However, the present invention has the distinct advantage of preparation of the substituted pyridines from basic and economical raw materials.

According to the invention, the substituted pyridines are prepared by reacting an ethylenically unsaturated hydrocarbon, carbon monoxide, hydrogen and ammonia in a liquid reaction medium containing a Group VIII noble metal-containing catalyst in complex association with a biphyllic ligand, all to be defined hereinafter.

The ethylenically unsaturated hydrocarbon reactant has two to about 24 carbons, preferably 2 to about 18 carbons and has the following formula:

$$R_2R_1C = CR_4R_3$$

wherein $R_1$, $R_2$, $R_3$ and $R_4$ are hydrogen or the same or different alkyl, cycloalkyl or aryl, preferably alkyl; or wherein one of said $R_1$ and $R_2$ groups together with one of said $R_3$ and $R_4$ groups together form an alkylene group resulting in a cycloalkene having 4 to 10 cyclic carbons.

As used herein, the terms alkyl, cycloalkyl and aryl include hydrocarbyl groups wherein the radical carbon of the group is in an alkyl, cycloalkyl or aryl group and thus includes groups such as aralkyl, alkaryl, alkylcycloalkyl, etc., as well as purely alkyl, cycloalkyl and aryl groups. Examples of alkyl groups therefore include ethyl, benzyl and phenylhexyl; examples of cycloalkyl include cyclohexyl and methylcyclopentyl; and examples of aryl include phenyl and p-dodecylphenyl. The particular hydrocarbyl group is not the essence of the invention since the functional carbons are the carbons forming the olefinic double bond.

Examples of useful unsaturated hydrocarbons are propylene, butene-1, butene-2, pentene-2, 2-methylbutene-1, hexene-1, 3-ethylhexene-1, octene-3, 2-propylhexene-1, decene-2, 4,4'-dimethylnonene-1, dodecene-1, 6-propyldecene-1, tetradecene-5, 7-amyldecene-3, hexadecene-1, 4-ethyltridecene-2, octadecene-1, 5,5-dipropyldodecene-3, eicosene-7, cyclobutene, cyclopentene, methylcyclopentene, cyclohexene, cyclooctene, cycloheptene, 1,4-dibutylcyclohexene, 3-cyclohexyldecene-2, vinylcylohexane, allylcyclohexane, styrene, p-methylstyrene, alpha-methylstyrene, beta-methylstyrene, p-vinylcumene, beta-vinylnaphthalene, 1,2-diphenylethylene, allylbenzene, 6-phenylhexene-1, 1,3diphenylbutene-1, 3-benzoheptene-3, o-vinyl-p-xylene, divinylbenzene, 1-allyl-4-vinylbenzene, 2,6-diphenyloctene, 5-butyl-7-cyclohexyl-nonene-2, 3-tolyl-4-ethyldodecene-7, etc. Of these the aliphatic hydrocarbon olefins having from about two to 18 carbons, e.g., ethylene, butene, dodecene, etc., are preferred and most preferred are the alpha alkenes having terminally unsaturated carbons e.g., butene-1, octene-1, decene-1, etc.

The catalyst employed of the invention is a Group VIII noble metal which is preferably in complex association with a biphyllic ligand of phosphorus, arsenic or antimony to be defined hereinafter.

The Group VIII noble metal can be palladium, rhodium, ruthenium, platinum, osmium or iridium. While catalysts containing any of these metals are active for the reaction, I prefer to employ rhodium-containing catalysts because of their demonstrated greater activity, particularly at the relatively mild reaction conditions employed for the reaction. A catalytic quantity of the Group VIII noble metal-containing catalyst is used. This is generally an amount sufficient to provide a concentration of the Group VIII noble metal which is between about 0.001 and about 5.0 weight percent of the liquid reaction medium and preferably between about 0.001 and about 0.5 weight percent. The Group VIII noble metal can be added to the reaction medium as a soluble salt, an acid, an ammino, halo, hydride, or carbonyl complex, or as the elemental metal. The particular form in which the metal is added is not critical since in all cases, it forms a complex with the biphyllic ligand.

Examples of suitable salts are the nitrates, halide, hydroxides, cyanides, sulfates, sulfites, carbonates, $C_1$-$C_{20}$ carboxylates, etc., of the metals such as rhodium nitrate, platinum nitrate, palladium chloride, rhodium fluoride, palladium hydroxide, platinum cyanide, osmium sulfate, rhodium sulfite, rhodium carbonate, palladium carbonate, platinum propionate, rhodium acetate, etc. Examples of suitable complexed sources are rhodium carbonyl, ruthenium pentacarbonyl, diamminepalladium hydroxide, tetramminepalladium tetrachloropalladate, tetrachlorodiammine platinum, aquopentammine iridium chloride, nitratopentammine iridium nitrate, palladium acetyl acetonate, hexachloroplatinic acid, tetracyanoplatinic acid, potassium hexachloroplatinate, ammonium tetracyanoplatinate, etc. The carbonyl of the Group VIII noble metal can be prepared externally and introduced into the reaction medium or the carbonyl compound can be produced in situ by the addition of the Group VIII noble metal and introduction of the carbon monoxide during the reaction to form an active carbonyl complex.

The biphyllic ligand which is in complex association with the Group VIII noble metal is a compound having an element with a pair of electrons capable of forming a coordinate bond with a metal atom and simultaneously having the ability to accept the electron from the metal, thereby imparting additional stability to the resulting complex. Biphyllic ligands can comprise organic compounds having at least about three carbons and containing arsenic, antimony or phosphorus in a trivalent state. Of these, the phosphorus compounds, i.e., the phosphines, are preferred; however, the arsines and stibines can also be employed. The biphyllic ligands are well known in the art and in general have the following structure:

or:

wherein E is a trivalent atom selected from the class consisting of phosphorus, arsenic and antimony; and wherein R is a member of the class consisting of hydrogen, alkyl having one to 10 carbons, cycloalkyl having four to 10 carbons, aryl having six to 10 carbons, and halo, amino and alkoxy substitution products thereof; and wherein R' is alkylene having from one to about eight carbons.

Examples of suitable biphyllic ligands having the aforementioned structure and useful in my invention to stabilize the catalyst composition are the following: phenylphosphine, propylarsine, diphenylstibine, diethylphosphine, dioctylarsine, methylpropylphosphine, trimethylphosphine, triethylarsine, triisopropylstibine, triaminobutylarsine, ethyldiisopropylstibine, tricyclohexylphosphine, triphenylphosphine, tri(o-tolyl)phosphine, phenyldiisopropylphosphine, phenyldiamylphosphine, diphenylethylphosphine, tris(diethylaminomethyl)phosphine, tritolylbismuthine, ethyldiphenylphosphine, phenylditolylphosphine, cyclopentyldixylstibine, dioctylphenylphosphine, ethylene bis(diphenylphosphine), hexamethylene bis(diisopropylarsine), pentamethylene bis(diethylstibine), etc. Of the aforementioned, the aryl phosphines, particularly the triarylphosphines, e.g., triphenylphosphine, are preferred because of their demonstrated greater activity for stabilization of catalysts.

The catalyst may be complexed with the above-described biphyllic ligand before being introduced into the reaction medium or the complex may be formed "in situ" by simply adding the metal and the biphyllic ligand directly into the reaction medium. In either case, it is generally preferable that the quantity of biphyllic ligand be in excess, e.g., 10–300 percent of that stoichiometrically required to form a complex with the metal and is generally 0.002–10 weight percent, preferably 0.002–2 percent of the reaction medium. The complex has from 1 to about 5 moles of biphyllic ligand per atom of metal and other components such as hydride, or soluble anions such as sulfate, nitrate, carboxylates, (e.g., acetate, propionate, isobutyrate, valerate, etc.), halide, etc. may be but need not be included in the complex catalyst of this invention. These components may be incorporated in the catalyst by the formation of the catalyst complex from a metal salt of the indicated anions. A preferred complex is one comprising at least one halide or carboxylate, ligand, e.g., chloride, bromide, iodide, fluoride, acetate, propionate, butyrate, benzoate, etc., since these groups, particularly the halides, improve the activity of the catalyst.

As a preferred embodiment the reaction medium also contains a poly(heterocyclic) saturated amine, preferably a bi or tri (heterocyclic) saturated hydrocarbon amine, having at least one nitrogen in a bridgehead position. The term "bridgehead position" is well established in chemical nomenclature to identify the position of an atom which is common to at least two of the rings of the polycyclic compound. Preferably the amine is an atom-bridged system, i.e., atoms, generally methylene carbons, form the bridge or line in the molecule rather than a simple valence bonding. The amine is used in catalytic amounts, e.g., from about 0.001 to about 10 weight percent, preferably from about 0.05 to 5 weight percent, of the liquid reaction medium. In general, amines having from one to about four nitrogen, preferably one or two nitrogens, and from one to about 25 carbons, preferably from two to about 10 carbons, can be employed for this purpose, the most preferred being the bi(heterocyclic) saturated hydrocarbon amines having one or two nitrogens and four to 10 carbons. The following is a listing of representative amines useful in my invention: 1,2,4-triazabicyclo(1.1.1)pentane; 1,5,6-triazabicyclo(2.1.1)hexane; 5-oxa-1,6-diazabicyclo(2.1.1)hexane; 5-thia-1,6-diazabicyclo (2.1.1)hexane; 2-oxa-1,5,6-triazabicyclo(2.1.1)hexane; 1,2,5,6-tetrazabicyclo(2.1.1)hexane; 5-oxa-1,2,3,6-tetrazabicyclo(2.1.1) hexane; 1-azabicyclo(3.3.1)heptane; 1-azabicyclo(2.2.1)heptane; 1,4-methano-1, 1-pyridine; 2-ox-1azabicyclo(2.2.1)heptane; 1,4-diazabicyclo(2.2.1)heptane; 7-oxa-1-azabicyclo(2.2.1)heptane; 7-thia-1-azabixyxlo(2.2.1)heptane; 1,7-diazabicyclo(2.2.1)heptane; 1,3,5-triazabicyclo(2.2.1)heptane; 1-azabicyclo(3.2.1)octane; 1,5-diazatricyclo(4.2.1)decane; 1,7-diazabicyclo(3.3.1.2) undecane; 7-ox-1-azabicyclo(3.2.1)octane; 1,7-diazabicyclo(3.2.1)octane; 3-thia-1,7-diazabicyclo(3.2.1)octane; 1,3,6,8-tetrazatricyclo(6.2.1.1dodecane; 2,8-diazatricyclo(7.3.1.1) tetradecane; 1-azabicyclo(3.3.1)nonene, also known as 1-isogranatinine and the oxo,hydroxy and lower alkyl derivatives thereof; 1-azabicyclo(2.2.2)octane also known as quinuclidine as well as the halo, oxo, hydroxy and lower alkyl derivatives thereof; 1-azatricyclo (3.3.1.1)decane; 1,3-diazabicyclo(2.2.2)octane; 1,3-diazabicyclo (3.3.1)nonene; 1,6-diazatricyclo(5.3.1.1)dodecane; 2-ox-1-azabicyclo(2.2.2)octane; 4,6,10-triox-1-azatricyclo(3.3.1.1)decane; 1,5-diazabicyclo(3.3.1)nonene; 1,2,5,8-tetrazatricyclo(5.3.1.1) dodecane; 1,4-diazabicyclo(2.2.2)octane also known as triethylene diamine and its oxo, hydroxy, halo and lower alkyl derivatives thereof; 1,3-diazatricyclo(3.3.1.1)decane also known as 1,3-diazaadamantane; 1,3,5-triazatricyclo(3.3.1)decane; 1,3,5,7-tetrazabicyclo(3.3.1) nonene also known as pentamethylene tetramine; 1,3,5,7-tetrazatricyclo(3.3.1.1) decane also known as hexamethylene tetramine; 2-oxa-1,3,4-triazabicyclo(3.3.1)nonene; 1-azabicyclo (4.3.1)decane; 1-azabicyclo(3.2.2)nonene; 1,5-diazabicyclo(3.2.2)nonene; 1,3,5,7-tetrazabicyclo(3.3.2)decane; 1,5-diazabicyclo (3.3.3)undecane; etc.

Of the aforementioned poly(heterocyclic) amines having a nitrogen in a bridgehead position the most common and widely known compounds is 1,4-diazabicyclo(2.2.2)octane, known as "DABCO", and this material as well as its oxo, hydroxy, halo and lower alkyl derivatives comprises the preferred amine for use in my process.

The reaction is performed under liquid phase conditions which may be hydrous or anhydrous; however, better yields are usually obtained if water is present. The reaction solvent may be water, concentrated ammonium hydroxide, or an organic solvent or mixtures thereof. Any conventional organic solvent, which is inert to the reactants, the catalyst, the products and the reaction conditions may be used. Examples of suitable solvents that can be used in accordance with my invention include hydrocarbons such as the aromatics, aliphatics or alicyclic saturated hydrocarbons, ethers, esters, ketones, alcohols, etc.

Examples of suitable solvents include benzene, toluene, xylene, ethylbenzene, tetralin, etc.; butane, pentane, isopentane, hexane, isohexane, heptane, octane, isooctane, naphtha, gasoline, kerosene, mineral oil, etc.; cyclopentane, cyclohexane, methylcyclopentane, decalin, indane, diisobutyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, ethanol, propanol, butanol, t-butyl alcohol, t-octyl alcohol, sec-pentyl alcohol, benzyl alcohol, etc.

The process may be conducted in the absence of solvent by providing an excess, e.g., 30-100 percent in excess of that stoichiometrically required, of the olefinic reactant if such is a liquid, or such an excess of the ammonia reactant if supplied as liquid ammonia or ammonium hydroxide. A preferred reaction medium is concentrated ammonium hydroxide.

The reaction is performed under relatively mild conditions including temperatures from about 50° to about 400° C.; preferably from about 70° to about 200° C. Sufficient pressure is used to maintain the reaction medium in liquid phase. Although atmospheric pressure can be used, the rate of reaction is increased by superatmospheric pressures and, therefore, pressures from about 5 to about 300 atmospheres absolute and preferably from about 10 to about 100 atmospheres are used. The ratio of the reactants can be widely varied if desired but preferably the molecular ratio of hydrogen to carbon monoxide is from about 1:10 to about 10:1. The reaction is exothermic and the temperature can be maintained by suitable cooling of all or a portion of the reaction zone contents. The pressures can be maintained by the pressure of the gases supplied to the reaction zone. If desired, a suitable inert gas, such as nitrogen, can also be charged to the reaction zone to reduce the partial pressures of the reacted gases, i.e., hydrogen and carbon monoxide.

Proportions of the reactants are not critical, although certain proportions may be optimum for a given ethylenically unsaturated compound, catalyst and solvent. Selection of optimum proportions will be obvious to one skilled in the art. In general, the amount of CO (based on the moles of ethylenically unsaturated hydrocarbon) is preferably from about 0.1 to 30 mole percent, the amount of $NH_3$ (supplied as a gas, as a liquid or as ammonium hydrocarbon) from about 0.1 to 95 mole percent and the amount of hydrogen from about 0.1 to 30 mole percent of the reactants.

The reaction is preferably conducted in the presence of a base and the ammonia reactant is sufficient to provide such base. Other bases such as ammonium hydroxide or the alkali metal and alkaline earth metal hydroxides, e.g., potassium hydroxide, calcium, hydroxide, strontium hydroxide, are advantageously used. The amount of such base can be from about 0.01 to 10 weight percent of the reaction medium.

The invention will be more specifically illustrated by the following non-limiting examples:

EXAMPLE 1

To a one-half gallon autoclave were added one-half grams rhodium trichloride, 5 grams 1,4-diazabicyclo(2.2.2)octane (DABCO), 5 grams triphenylphosphine and 400 milliliters concentrated ammonium hydroxide. The autoclave was pressured with ethylene to 200 atmospheres, carbon monoxide to 42 atmospheres, and hydrogen to 38 atmospheres. The mixture was mechanically stirred and heated to 100° C. for 2 hours, then 200° C. for 2 hours. The final pressure was 29 atmospheres. There was found a 15 milliliter organic layer which was shown to contain a mixture of 3,5-dimethyl, 2-ethyl pyridine and 3,5-dimethyl, 4-ethyl pyridine in 54 percent yield as deduced by preparative gas phase chromatography, infrared spectrum and nuclear magnetic resonance.

EXAMPLE 2

In a similar manner with 0.3 g rhodium trichloride, 3 g of triphenylphosphine, 3 g of DABCO and 20 g of ammonium acetate with 400 ml of concentrated ammonium hydroxide with ethylene to 400 psi, carbon monoxide to 600 psi and hydrogen to 700 psi the mixture was stirred and heated to 100° C. for 2 hours, then 200° C. for 2 hours. There was a 37 g weight increase of which 50 percent was a mixture of dimethyl ethyl pyridines as in Example 1. The autoclave was cleaned with aqua regia and washed with water and acetone. The above run was repeated but no additional rhodium was added. The product yield fell to 20 g weight increase. Upon disassembly, a visual inspection of the cleaned autoclave showed that rhodium had precipitated onto the walls and several runs could be repeated without using additional rhodium.

EXAMPLE 3

To 5 g triphenylphosphine, 10 g sodium hydroxide and 400 ml of concentrated ammonium hydroxide in the conditioned autoclave from Example 2 were added ethylene 1 to 400 psi, carbon monoxide to 700 psi and hydrogen to 1,000 psi. The mixture was stirred and heated to 100° C. for 2 hours. There was a 70 g weight increase of which 35 percent was dimethyl ethyl pyridines as in Example 1 and 16 percent was 2(1'-methyl-1'butenyl)3,5-dimethyl pyridine.

To 0.1 g bis(triphenylphosphine)carbonylrhodium(I)chloride, 5 g triphenylphosphine, 300 ml pyridine and 142 g ammonia were added ethylene to 400 psi, carbon monoxide to 700 psi and hydrogen to 1,000 psi. The mixture was stirred and heated to 100° C. for 2 hours. The reaction was quite exothermic and there was an 80 g weight increase.

EXAMPLE 4

To 0.1 g bis(triphenylphosphine)carbonylrhdoium(I)chloride, 3 g triphenylphosphine, 300 ml tertiary amyl alcohol, 2 g sodium hydroxide and 155 g of ammonia were added ethylene to 400 psi, carbon monoxide to 700 psi and hydrogen to 1,200 psi. The mixture was stirred and heated to 100° C. for 2 hours. There was a 92 g weight increase and propionaldehyde, 2-methylpentenal and the dimethyl ethyl pyridines of Example 1 were found.

I claim:

1. A process for the production of an $R_1$, $R_2$, $R_3$ and $R_4$ hydrocarbyl-substituted pyridine comprising reacting an ethylenically unsaturated hydrocarbon having two to 24 carbons and having the structure:

$$R_2R_1C = CR_4R_3$$

wherein $R_1$, $R_2$, $R_3$ and $R_4$ are the same or different univalent radicals selected from hydrogen, alkyl, arylalkyl, cycloalkyl alkylcycloalkyl, aryl, or alkylaryl, or wherein one of said $R_1$ or $R_2$ groups together with one of said $R_3$ and $R_4$ groups together form an alkylene group resulting in a cycloalkene having four to 10 cyclic carbons; carbon monoxide; ammonia and hydrogen in a liquid medium comprising an inert solvent or from 30 to 100 percent excess of said ammonia, olefin or ammonium hydroxide and containing 0.001–5 weight percent of a Group VIII noble metal in complex association with 0.002 to 10 weight percent of a biphyllic ligand having at least three carbons and having the structure:

$$E(R)_3 \text{ or } (R)_2 E R^1 E(R)_2$$

wherein E is trivalent phosphorus, arsenic or antimony; R is hydrogen, alkyl having from one to 10 carbons, cycloalkyl having from four to 10 carbons, or phenyl or a halo methyl, amino, or alkoxy substitution product thereof having six to 10 carbons; and $R^1$ is alkylene having one to eight carbons; said reaction being conducted at a temperature of 50° to 400° C. and a pressure of 5 to 300 atmospheres sufficient to maintain liquid phase.

2. The process of claim 1 in which the Group VIII noble metal is rhodium.

3. The process of claim 1 in which the ethylenically unsaturated hydrocarbon is an alpha alkene having two to 18 carbons.

4. The process of claim 3 in which the alkene is ethylene.

5. The process of claim 1 in which the noble metal is supplied to the reaction medium as a salt soluble in the reaction medium to form said complex in situ.

6. The process of claim 1 in which the biphyllic ligand is triphenylphosphine.

7. The process of claim 2 wherein the catalyst is formed by adding rhodium trichloride to the reaction medium and wherein at least one of the R groups of said biphyllic ligand is phenyl.

8. The process of claim 1 in which the reaction medium contains 0.001 to 10 weight percent of a bi- or tri-heterocyclic saturated amine having at least one nitrogen in the bridgehead position and having 2 to 10 carbons and 1 to 2 heterocyclic nitrogens.

9. The process of claim 8 wherein said amine is bicyclic.

10. The process of claim 9 in which the amine is 1,4-diazabicyclo(2.2.2)octane.

11. The process of claim 9 wherein said catalyst is rhodium in complex association with triphenylphosphine.

12. The process of claim 11 wherein said ethylenically unsaturated hydrocarbon is an alpha alkene having 2 to 18 carbons.

13. The process of claim 12 wherein said alkene is ethylene.

* * * * *